(12) United States Patent
Rude et al.

(10) Patent No.: US 9,142,065 B2
(45) Date of Patent: Sep. 22, 2015

(54) OBD BASED IN-VEHICLE DEVICE PROVIDING CONTENT STORAGE AND ACCESS

(71) Applicant: Zubie, Inc., Bloomington, MN (US)

(72) Inventors: Michael John Rude, Excelsior, MN (US); Ari Abram Silkey, Burnsville, MN (US)

(73) Assignee: Zubie, Inc., Bloomington, MN (US)

( * ) Notice: Subject to any disclaimer, the term of this patent is extended or adjusted under 35 U.S.C. 154(b) by 73 days.

(21) Appl. No.: 14/042,897

(22) Filed: Oct. 1, 2013

(65) Prior Publication Data
US 2014/0095014 A1 Apr. 3, 2014

Related U.S. Application Data

(60) Provisional application No. 61/708,402, filed on Oct. 1, 2012.

(51) Int. Cl.
*G07C 5/00* (2006.01)
*H04L 29/08* (2006.01)

(52) U.S. Cl.
CPC ............... *G07C 5/008* (2013.01); *H04L 67/12* (2013.01); *G07C 2205/02* (2013.01)

(58) Field of Classification Search
CPC ..... G07C 5/008; G07C 2205/02; H04L 67/12
USPC ........................................ 701/31.4; 709/217
See application file for complete search history.

(56) References Cited

U.S. PATENT DOCUMENTS

| 5,430,432 A | 7/1995 | Camhi et al. |
| 5,465,079 A | 11/1995 | Bouchard et al. |
| 5,499,182 A | 3/1996 | Ousborne |
| 5,797,134 A | 8/1998 | McMillan et al. |
| 6,064,970 A | 5/2000 | McMillan et al. |
| 6,594,579 B1 | 7/2003 | Lowrey et al. |

(Continued)

FOREIGN PATENT DOCUMENTS

JP H4182868 6/1992

OTHER PUBLICATIONS

Rude et al., "Methods and Systems for Consumer Controlled Insurance Data Management", "U.S. Appl. No. 13/972,400", Aug. 21, 2013, pp. 1-25.

(Continued)

*Primary Examiner* — Tuan C. To
(74) *Attorney, Agent, or Firm* — Fogg & Powers LLC

(57) ABSTRACT

One embodiment is directed to an electronic device comprising a connector configured to connect to an on-board diagnostic (OBD) connector of a vehicle, a wireless transceiver, one or more processing devices coupled to the connector and to the wireless transceiver, and storage media coupled to the one or more processing devices. The storage media including instructions which, when executed by the one or more processing devices, cause the one or more processing devices to establish communication with a content control device using the wireless transceiver, download content from the content control device, store the content on the storage media, and terminate communication with the content control device. The instructions also cause the one or more processing devices to establish communication with a mobile device, and provide the content to a mobile device via a wireless link.

20 Claims, 3 Drawing Sheets

(56) References Cited

U.S. PATENT DOCUMENTS

| | | |
|---|---|---|
| 6,636,790 B1 | 10/2003 | Lightner et al. |
| 6,714,894 B1 | 3/2004 | Tobey et al. |
| 6,732,031 B1 | 5/2004 | Lightner et al. |
| 6,868,386 B1 | 3/2005 | Henderson et al. |
| 7,124,088 B2 | 10/2006 | Bauer et al. |
| 7,877,269 B2 | 1/2011 | Bauer et al. |
| 8,090,598 B2 | 1/2012 | Bauer et al. |
| 8,140,358 B1 | 3/2012 | Ling et al. |
| 8,626,568 B2 * | 1/2014 | Warkentin et al. ............ 705/7.38 |
| 8,645,051 B2 * | 2/2014 | Walthers ........................ 701/117 |
| 2002/0188484 A1 | 12/2002 | Grover et al. |
| 2005/0065679 A1 * | 3/2005 | Kawauchi et al. .............. 701/29 |
| 2008/0119983 A1 | 5/2008 | Inbarajan et al. |
| 2011/0090075 A1 | 4/2011 | Armitage et al. |
| 2011/0125363 A1 | 5/2011 | Blumer et al. |
| 2011/0153367 A1 | 6/2011 | Amigo et al. |
| 2011/0196571 A1 | 8/2011 | Foladare et al. |
| 2012/0004933 A1 | 1/2012 | Foladare et al. |
| 2012/0005108 A1 | 1/2012 | Hollenshead et al. |
| 2012/0010906 A1 | 1/2012 | Foladare et al. |
| 2012/0026010 A1 * | 2/2012 | Owens et al. ............ 340/870.39 |
| 2012/0066007 A1 | 3/2012 | Ferrick et al. |
| 2012/0109692 A1 | 5/2012 | Collins et al. |
| 2012/0209634 A1 | 8/2012 | Ling et al. |
| 2012/0239223 A1 * | 9/2012 | Schwarz et al. ................... 701/2 |
| 2012/0239462 A1 | 9/2012 | Pursell et al. |
| 2012/0313771 A1 | 12/2012 | Wittliff, III |
| 2013/0030870 A1 | 1/2013 | Swinson et al. |
| 2013/0054107 A1 | 2/2013 | Harvie |
| 2013/0073169 A1 * | 3/2013 | Emberson et al. .............. 701/99 |
| 2013/0282227 A1 * | 10/2013 | Chen et al. ................... 701/31.5 |
| 2013/0289873 A1 | 10/2013 | Mitchell |
| 2013/0290569 A1 * | 10/2013 | Luo et al. ........................... 710/5 |
| 2014/0052531 A1 * | 2/2014 | Kent et al. .................. 705/14.49 |
| 2014/0058618 A1 | 2/2014 | Rude et al. |
| 2014/0058762 A1 | 2/2014 | Rude et al. |
| 2014/0077972 A1 * | 3/2014 | Rathi et al. ..................... 340/902 |
| 2014/0189814 A1 * | 7/2014 | Marten et al. ...................... 726/4 |
| 2014/0200760 A1 * | 7/2014 | Kaufmann et al. .......... 701/29.3 |

OTHER PUBLICATIONS

Rude et al., "Methods and Systems for Vehicle Valuation From OBD Based Operational Data", "U.S. Appl. No. 13/972,428", Aug. 21, 2013, pp. 1-18.

Rude et al., "Methods and Systems for Brokering Insurance", "U.S. Appl. No. 61/691,987", Aug. 22, 2012, pp. 1-19.

Rude et al., "Methods and Systems for Vehicle Valuation From OBD Based Operation Data", "U.S. Appl. No. 61/749,620", Jan. 7, 2013, pp. 1-14.

"Office Action for U.S. Appl. No. 13/972,428", Jan. 22, 2015, pp. 1-14, Published in: US.

"Final Office Action for U.S. Appl. No. 13/972,400", Jan. 7, 2015, pp. 1-31, Published in: US.

"Office Action", "For U.S. Appl. No. 13/972,400", Sep. 18, 2014, pp. 1-19, Published in: US.

"Office Action", "For U.S. Appl. No. 13/972,428", Aug. 28, 2014, pp. 1-19.

"Final Office Action", "from U.S. Appl. No. 13/972,428", May 15, 2015, pp. 1-14, Published in: U.S.

* cited by examiner

OBD BASED IN-VEHICLE DEVICE PROVIDING CONTENT STORAGE AND ACCESS

CROSS-REFERENCE TO RELATED APPLICATIONS

This application claims the benefit of U.S. Provisional Patent Application Ser. No. 61/708,402, filed on Oct. 1, 2012, which is hereby incorporated herein by reference.

BACKGROUND

Content service providers desire to provide access to content, but under strict control. The content is controlled to reduce the risk of unauthorized copying and distribution. This control has traditionally limited the content to devices that comply with guidelines provided by the content service provider (e.g., devices manufactured under control of the content service provider such as a set top box) or for devices that are not required to comply with the guidelines (e.g., personal computing devices) the content is streamed to such devices so that the content is not stored in any permanent way on the device.

SUMMARY

One embodiment is directed to an electronic device comprising a connector configured to connect to an on-board diagnostic (OBD) connector of a vehicle, a wireless transceiver, one or more processing devices coupled to the connector and to the wireless transceiver, and storage media coupled to the one or more processing devices. The storage media including instructions which, when executed by the one or more processing devices, cause the one or more processing devices to establish communication with a content control device using the wireless transceiver, download content from the content control device, store the content on the storage media, and terminate communication with the content control device. The instructions also cause the one or more processing devices to establish communication with a mobile device, and provide the content to a mobile device via a wireless link.

DRAWINGS

DETAILED DESCRIPTION

Practically speaking this control has limited access to the content to TVs in the home, and to mobile devices that can be wirelessly coupled to a content control device (e.g., a set top box) which complies with the guidelines provided by the content service provider. Both of these limits provide access to the content only when in or near the home of the subscriber. Recently, content service providers have also been providing content over the internet to a personal computing device of a subscriber, after the subscriber performs some sort of authentication. This information is typically streamed to the personal computing device to limit the ability for long term storage and copying of the content on the personal computing device. Internet streaming can provide access to content outside of the home (as well as inside the home), but it is limited by the speed at which the information can be streamed, as well as being limited by the requirement of a present internet connection.

Embodiments described herein provide for an electronic device that can be connected to an on-board diagnostics (OBD) port of a vehicle and provide storage of and access to content controlled by a content service provider. Such an electronic device is referred to herein as an "OBD content device". The OBD content device includes a wireless transceiver for communicating with a content control device at a subscriber's premises. Via the wireless transceiver and while coupled to the OBD connector of the vehicle, the OBD content device can download content from a content control device at the subscriber's premises. The OBD content device can store the downloaded content therein and provide access to the content to a subscriber via wireless connection with a mobile device. Notably, the OBD content device can be manufactured in compliance with guidelines implemented by the content service provider such that the content service provider can be assured of the controlled access of the content. In this way, the content controlled by the content service provider can be accessed by the subscriber while away from home with their vehicle, and can still be within control of the content service provider.

Figure 1:
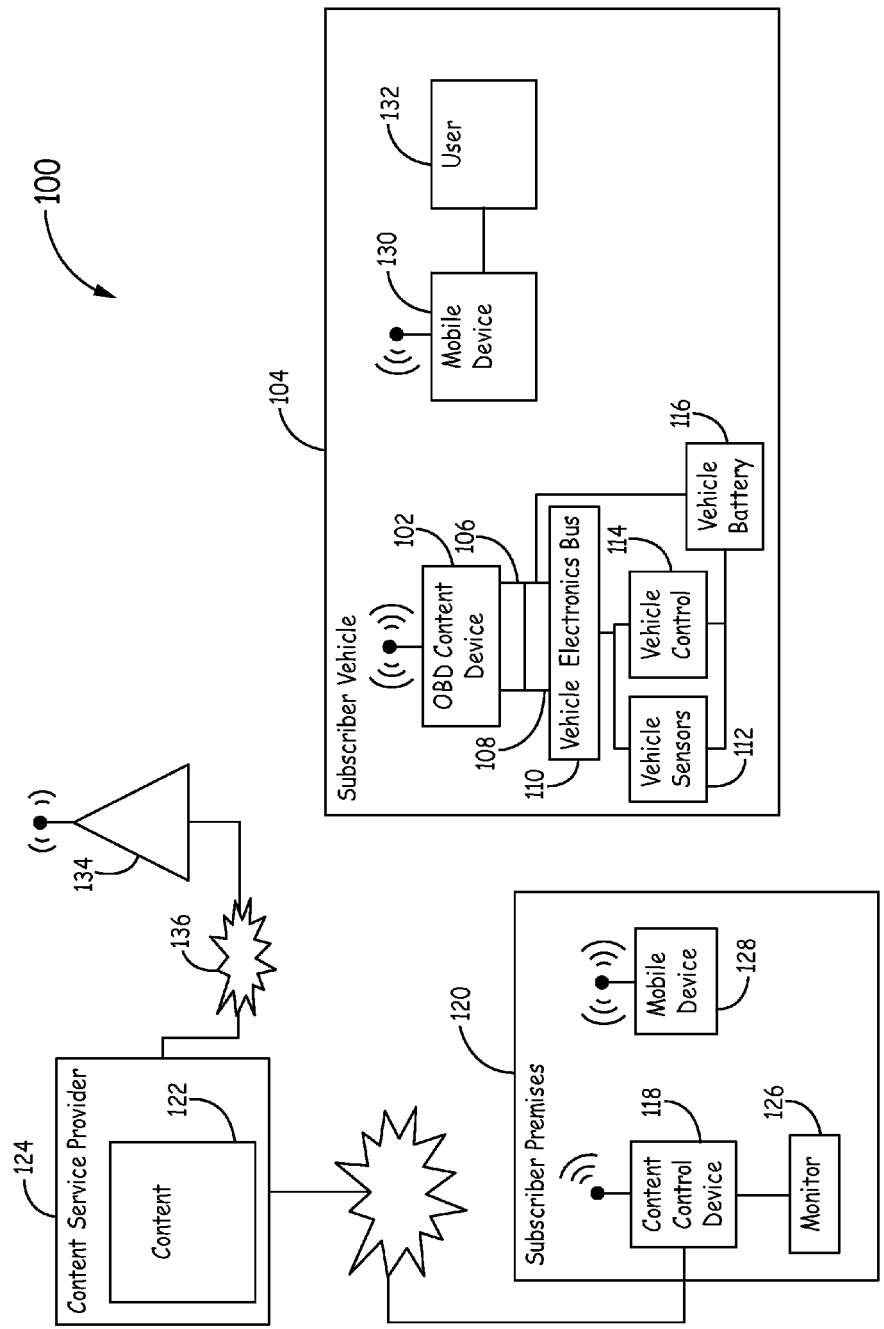
FIG. 1 is a block diagram of an example of a system including an OBD content device.

FIG. 1 is a block diagram of an example of a system 100 including such an OBD content device 102. The system 100 includes a subscriber vehicle 104 in which the OBD content device 102 is installed. The OBD content device 102 includes an OBD connector 106 configured to connect to a mating OBD connector 108 on the vehicle 104. The OBD connector 108 on the vehicle 104 is coupled to a vehicle electronics bus 110 over which vehicle sensors 112, vehicle control electronics 114 and other electronics in the vehicle 104 communicate. The vehicle sensors 112 and the vehicle control electronics 114 receive power from a battery 116 in the vehicle 104. As known, this battery 116 can also be the battery that provides power for starting and/or driving the vehicle 104. The battery 116 can also be coupled to a plurality of conductors on the OBD connector 108 of the vehicle 104. These conductors can contact corresponding power conductors on the OBD connector 106 of the OBD content device 102 to provide power to the OBD content device 102. In this way, the OBD content device 102 can obtain operating power from the battery 116 of the vehicle 104 through the OBD connectors 106, 108. Example OBD connectors 106, 108 include the SAE-11962 connector, which is the connector for the OBD-II protocol described in the SAE-11978 standard. The vehicle 104 can include any vehicle having an OBD connector including, but not limited to a car, pick-up, SUV, van, bus, motorcycle, motorhome, semi tractor, delivery truck, or construction vehicle.

The OBD content device 102 is configured to wirelessly communicate with a content control device 118 at the subscriber's premises 120. The content control device 118 is an electronic device that can receive content 122 from a content service provider 124 and provide access to the content 102 for a subscriber (i.e., an entity subscribing to service provided by the content service provider 124). For example, the content control device 118 can be a set top box configured to receive content from the content service provider 124 and format the content for display on a monitor 126 (e.g., a television). As another example, the content control device 118 can be a modem configured to communicate with the content service provider 124 to receive content and forward the content to other devices (e.g., a set top box) at the subscriber's premises.

Some examples of content control device 118 can include a digital video recorder such that a subscriber can store selected content on the content control device 118.

In some examples, the OBD content device 102 is also configured to wirelessly communicate with other content control devices 118 at other subscriber's premises. Since the content service provider 124 has multiple subscriber's in various locations, the OBD content device 102 can be configured to wirelessly communicate not only with the content control device 118 for the subscriber with which the OBD content device 102 is associated, but also with content control devices 118 for other subscribers of the content service provider 124. This can enable the OBD content device 102 to download and store (e.g., sync) content whenever the OBD content device 102 is within range of any (appropriately configured) content control device 118 associated with the particular content service provider 124. In this way, the OBD content device 102 can download and store content even when away from the subscriber's premises 120, as long as another content control device 118 is within range for wireless communication.

The content control device 118 is a device that complies with guidelines (e.g., standards or specifications) provided by the content service provider 124 or another entity, such that the content service provider 124 can be assured of the control of the content while the content is at the content control device 118. In many instances, the content control device 118 is a device that is provided to the subscriber by the content service provider 124. In some examples, multiple content control devices can be present at the subscriber's premises 120 to, for example, provide content to multiple monitors 126. The content 122 can be provided from the content service provider 124 to the content control device 118 in any suitable manner such as, for example, via coaxial cable, a satellite dish at the subscriber's premises 120, twisted pair medium, mobile network, the Internet, a combination of these, or other suitable means. Example content service providers include providers of subscription based television and/or Internet services such as Comcast, Dish Network, Charter Communications, DirecTV, and others.

In an example, the content control device 118 can be configured to wirelessly communicate directly with the OBD content device 102 as well as other devices. In such an example, the content control device 118 can include its own wireless transceiver and antenna. In other examples, however, the content control device 118 can be configured to couple to a separate wireless networking device to provide wireless communication for the content control device 118. In any case, the content control device 118 can be configured to communicate with the OBD content device 102 in order to send content to the OBD content device 102. In some examples, the content control device 118 can also be configured to wirelessly communicate with a mobile personal computing device 128 in order to provide content to the mobile device 128 and/or to enable a user to control (e.g., change channels, select content) the content control device 118 from the mobile device 128. Wireless communication between the content control device 118 and the OBD content device 102 and/or the mobile device 128 can use any suitable wireless transmission protocol including, but not limited to IEEE 802.11 (WiFi), IEEE 802.14.5 (ZigBee), and Bluetooth.

In some examples, the OBD content device 102 is configured to wirelessly communicate with other electronic content devices that are not associated with a particular content service provider 124. Such other electronic devices can include a personal computer or non-content service provider digital video recording device, such as the electronic devices produced by TiVo. The OBD content device 102 can be configured to download and store (e.g., sync) content from such an electronic content device via wireless communication. The electronic content device can be configured to send (e.g., sync) content with the OBD content device 102. The wireless communication between such electronic content device and the OBD content device 102 can use any suitable wireless transmission protocol including, but not limited to IEEE 802.11 (WiFi), IEEE 802.14.5 (ZigBee), and Bluetooth. Such an electronic content device can be coupled to and receive content from the Internet, a terrestrial broadcast antenna, cable TV or satellite TV provider, or other suitable means.

When the OBD content device 102 is within range of wireless communication with the content control device 118 and/or other electronic content devices, the OBD content device 102 can download content from the content control device 118 and/or other electronic content devices and store the content locally on the OBD content device 102. As described above, in some examples, the OBD content device 102 can also download and store content from content control devices 118 of other subscribers. The OBD content device 102 can then provide access to this locally stored content for one or more mobile devices 130 in or near the vehicle 104. In particular, when the vehicle 104 is away from the subscriber's premises 120, the mobile device 130 can communicate with the OBD content device 102 to access the content thereon for consumption by the user 132. The OBD content device 102 can wirelessly communicate with the mobile device 130 in order to stream or otherwise provide the content to the mobile device 130. The wireless communication between the OBD content device 102 and the mobile device 130 can use any suitable wireless transmission protocol including, but not limited to IEEE 802.11 (WiFi), IEEE 802.14.5 (ZigBee), and Bluetooth. The mobile device 130 can be any personal computing device having wireless connectivity with the OBD content device 102 such as a mobile phone, tablet, laptop, personal digital assistant (PDA), or other similar device.

In some examples, the OBD content device 102 complies with guidelines (e.g., standards or specifications) implemented by the content service provider 124 or another entity (e.g., TiVo). For example, such guidelines may require that the OBD content device 102 control content thereon in order to reduce the possibility of unauthorized copying of or access to the content. In one implementation, the guidelines can require the OBD content device 102 to provide a password to the content control device 118 in order to receive content therefrom. Additionally, such guidelines may require that video content provided to a mobile device 130 is streamed thereto and the other content is provided in a manner such that the mobile device 130 only has temporary access thereto. In examples where the OBD content device 102 does not communicate with a content control device 118 or an electronic content device having an association with a similar service (e.g., TiVo), the OBD content device 102 may not comply with any such guidelines.

In some examples, the OBD content device 102 can wirelessly communicate with a cellular tower 134. Via the wireless connection to the cellular tower 134, the OBD content device 102 can function as a hot spot to provide Internet connectivity to the mobile device 130. In such examples, the OBD content device 102 can also obtain content from the content service provider 124 over the Internet 136 via the cellular tower 134. The wireless communication between the OBD content device 102 and the cellular tower 134 can use any suitable wireless transmission protocol including, but not limited to a 3G or 4G protocol (e.g., WiMax, LTE). Typically, the wireless communication with the cellular tower 134 will use a different wireless transceiver within the OBD content device 102 than the wireless communication with the content control device 118, however, in some examples, the same transceiver can be used.

Figure 2:
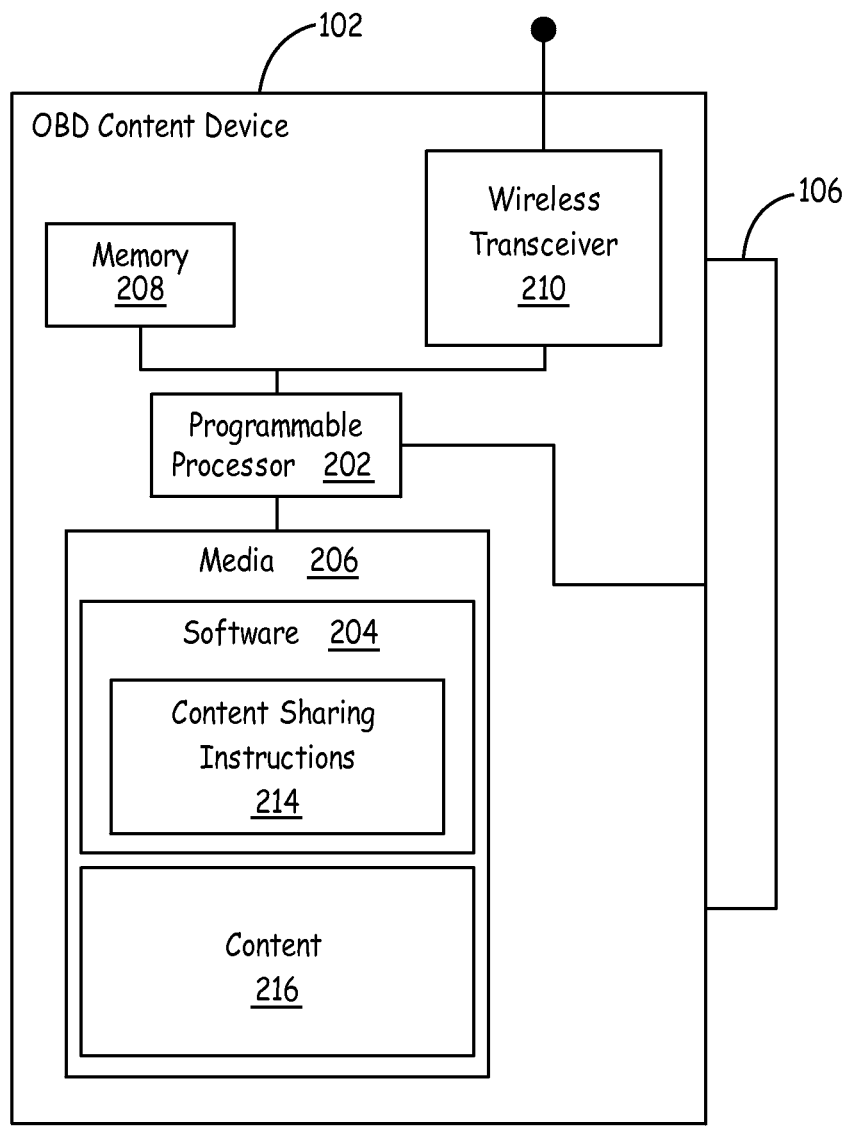
FIG. 2 is a block diagram of an example OBD content device for use in the system of FIG. 1.

FIG. 2 is a block diagram of an example of an OBD content device 102. The OBD content device 102 can include one or more processing devices 202 for executing instructions 204. The one or more processing devices 202 can include a general purpose processor or a special purpose processor. The instructions 204 are stored (or otherwise embodied) on or in an appropriate storage medium or media 206 (such as flash or other non-volatile memory) from which the instructions 204 are readable by the programmable processor(s) 202 for execution thereby. The OBD content device 102 also includes memory 208 that is coupled to the programmable processor(s) 202 for storing instructions (and related data) during execution by the programmable processor(s) 202. Memory 208 comprises, in one implementation, any suitable form of random access memory (RAM) now known or later developed, such as dynamic random access memory (DRAM). In other implementations, other types of memory are used. The OBD content device 102 also includes a wireless transceiver 210 for communicatively coupling the OBD content device 102 to the content control device 118 and to mobile device(s) 130. As mentioned above, in some examples, the OBD content device 102 can include a second wireless transceiver for communication with a cellular tower 134. The OBD content device 102 also includes an OBD connector 106 (such as a SAE-J1978 or OBD-II connector) for connecting to a complementary OBD connector 108 (e.g., a SAE-J1978 connector) on the vehicle 104. The instructions 204 on the OBD content device 102 include content sharing instructions 214 that are configured to cause the programmable processor(s) 202 to implement the functions of OBD content device 102 described herein. The media 206 can also include content 216 stored thereon. The content 216 can be downloaded from the content control device 118 or the cellular tower 134 as described above. The content 216 can include any content to be consumed by a user 132 of a mobile device 130. For example, the content 216 can include video(s) (e.g., movie(s), sitcom episode(s), on-demand programs), image(s) (e.g., photo(s)), audio (e.g., music), electronic written works (e.g., electronic books, magazines, articles), and other content.

Figure 3:
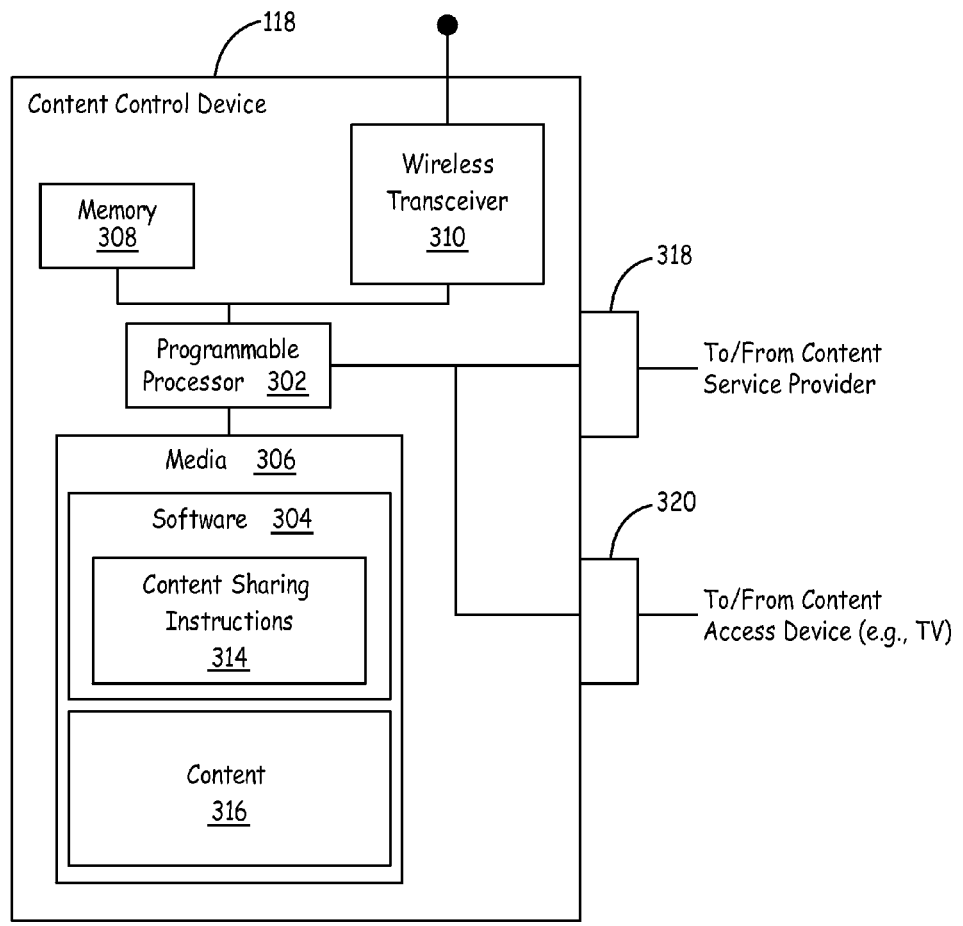
FIG. 3 is a block diagram of an example content control device for use in the system of FIG. 1.

FIG. 3 is a block diagram of an example of a content control device 118. The content control device 118 can include one or more processing devices 302 for executing instructions 304. The one or more processing devices 302 can include a general purpose processor or a special purpose processor. The instructions 304 are stored (or otherwise embodied) on or in an appropriate storage medium or media 306 (such as flash or other non-volatile memory) from which the instructions 304 are readable by the programmable processor(s) 302 for execution thereby. The content control device 118 also includes memory 308 that is coupled to the programmable processor(s) 302 for storing instructions (and related data) during execution by the programmable processor(s) 302. Memory 308 comprises, in one implementation, any suitable form of random access memory (RAM) now known or later developed, such as dynamic random access memory (DRAM). In other implementations, other types of memory are used. The content control device 118 also includes a wireless transceiver 310 for communicatively coupling the content control device 118 to the OBD content device 102 and to mobile device(s) 128. The content control device 118 also includes a first connector 318 (such as a coaxial cable connector) for connecting to a physical communication medium (e.g., a coaxial cable) for receiving content and possibly communicating with the content service provider 124. The content control device 118 can also include one or more second connectors 320 for connecting to a physical communication medium (e.g., an HDMI cable) to provide content to the monitor 126. The instructions 304 on the content control device 118 include content sharing instructions 314 that are configured to cause the programmable processor(s) 302 to provide content to the OBD content device 102 as described herein. The media 306 can also include content 316 stored thereon. The content 316 can be content stored and/or downloaded from the content service provider 124.

Referring back to FIG. 1, in examples where the OBD content device 102 is used with a content control device 118, the OBD content device 102 may be obtained by the subscriber via a retail outlet or directly from the content service provider 124. Once obtained, the subscriber can install the OBD content device 102 in a vehicle 104 by connecting the OBD connector 106 of the OBD content device 102 to the OBD connector 108 of the vehicle 104. Upon connection with the OBD connector 108 of the vehicle 104, the OBD content device 102 can initiate operation.

In some examples where the OBD content device 102 is used with a content control device 118 or other electronic content device having an association with a similar service (e.g., TiVo), the OBD content device 102 is provisioned for operation by the content service provider 124 or other entity. Provisioning can include providing identification information (e.g., a serial number) for the OBD content device 102 to the content service provider 124 or other entity, as well as some identifying information for the subscriber such that the content service provider 124 can associate the particular OBD content device 102 with the subscriber's account. Instead of, or in addition to, providing identification information for the OBD content device 102, provisioning can include providing identification information for the vehicle 104 in which the OBD content device 102 is (to be) installed to the content service provider 124. The identification information for the vehicle 104 can include a vehicle identification number (VIN) or other vehicle fingerprinting information such as a module number of the vehicle control electronics 114 (e.g., an electronics control unit (ECU) and/or a number of parameter IDs (PIDs) supported by the vehicle control electronics 114. As such the vehicle 104 can be associated with the subscriber's account.

In operation, the OBD content device 102 can be configured to detect a signal from the content control device 118 and/or other electronic content device to determine when the OBD content device 102 is within range for wireless communication with the content control device 118. When the OBD content device 102 determines that it is within range of the content control device 118 and/or other electronic content device, the OBD content device 102 can establish wireless communication with the content control device 118 and/or other electronic content device.

In some examples, once communication is established, the OBD content device 102 can be authenticated to establish whether the OBD content device 102 is allowed to access content 316 on the content control device 118. In one implementation, authentication can include the OBD content device 102 sending identifying information (e.g., a serial number) for the OBD content device 102 and/or a password to the content control device 118. In addition to, or instead of, sending identifying information for the OBD content device 102 and/or a password, authentication can include the OBD content device 102 sending identification information for the vehicle 104 in which the OBD content device 102 is installed.

In such an implementation, the OBD content device 102 can obtain identification information for the vehicle 104 via communication with a vehicle device over the OBD connectors 106, 108 and the vehicle electronics bus 110. The OBD content device 102 can query the appropriate vehicle device connected to the vehicle electronics bus 110 to obtain the identification information for the vehicle 104. As an example, the identification information for the vehicle 104 can include a vehicle identification number (VIN), ECU module number, and/or number of parameter IDs (PIDs). Once the OBD content device 102 has obtained the identification information for the vehicle 104, the OBD content device 102 can provide the identification information for the vehicle 104 to the content control device 118.

The content control device 118 can receive the identification information (for the OBD content device 102 and/or the vehicle 104) and determine whether an OBD content device 102 providing such identification information is authorized to access the content 316 on the content control device 118. In an example, the content control device 118 can receive information from the content service provider 124 (e.g., based on the information provided during provisioning) that indicates what OBD content device(s) 102 and/or vehicle(s) 104 are authorized to access the content 316. In any case, the content control device 118 can either authorize or not authorize access to the content 316 based on the identification information provided. In this way, the content control device 118 can restrict access to the content 316 stored thereon, by authenticating the OBD content devices 102. Moreover, the ability of the OBD content device 102 to independently (of a user) obtain vehicle identification information, provides an additional level of authentication by authenticating the vehicle 104 in which the OBD content device 102 is installed.

Once communication has been established and the OBD content device 102 has been authenticated if necessary, the OBD content device 102 can access content 316 on the content control device 118 and/or other electronic content device. In an example, the content control device 118 and/or other electronic content device can be configured to send selected content (e.g., based on selection by a user) to the OBD content device 102. In another example, the OBD content device 102 can be configured to sync content with the content control device 118 and/or other electronic content device such that the OBD content device 102 contains the same content as the content control device 118 and/or other electronic content device (e.g., either all the same content, or the same content in a selected category or the like). The content received by the OBD content device 102 can be stored in the media 206 for future access.

When the content control device 118 and/or other electronic content device has finished sending content to the OBD content device 102 or when the OBD content device 102 leaves the range of wireless communication with the content control device 118 and/or other electronic content device, communication between the content control device 118 and/or other electronic content device and the OBD content device 102 can be terminated.

In examples, where the OBD content device 102 is configured to wireless communicate with other content control devices 118 associated with other subscribers, the OBD content control device 102 can perform similar acts to establish communication, authenticate (if necessary), download, and store content from such other content control devices 118 when the OBD content device 102 determines that it is within range of wireless communication with such other content control devices 118.

With content 216 on the OBD content device 102, the OBD content device 102 can provide access to the content 216 stored thereon. To access the content 216, a mobile device 130 can establish wireless communication with the OBD content device 102. Once communication is established, the OBD content device 102 can stream or otherwise provide access to the content 216 as selected by a user 132 of the mobile device 130.

In some examples, the content control device 118 and the OBD content device 102 can be configured to implement a hand-off of a mobile device 128, 130. The hand-off can be used to provide a seamless transition of content access for a mobile device 128, 130 as the mobile device 128, 130 transitions between accessing content 316 on the content control device 118 and accessing content 216 on the OBD content device 102. For example, if a mobile device 128 is streaming a movie from the content 316 on the content control device 118 and a user holding the mobile device 128 leaves the subscriber's premises 120 in the vehicle 104, the content control device 118 can be configured to hand-off the mobile device 128 to the OBD content device 102, such that the mobile device 128 can continue to stream the movie from the content 216 on the OBD content device 102. This hand-off can be implemented in any suitable manner, such as by communications between the content control device 118 and the OBD content device 102 indicating the signal strength of signals from the mobile device 128 to the content control device 118 and the OBD content device 102 respectively. Once the signal strength is low enough at the content control device 118 and high enough at the OBD content device 102 the hand-off can be implemented. In addition, the content control device 118 can provide the OBD content device 102 with an indication of the content being consumed and the location within the content, if appropriate. Accordingly, the OBD content device 102 can take over streaming the movie to the mobile device 128 after the hand-off. A similar process can occur for a hand-off from the OBD content device 102 to the content control device 118.

In examples where the OBD content device 102 can wirelessly communicate with the cellular tower 134, the OBD content device 102 can also download (e.g., sync) content with content 122 at the content service provider 124 (i.e., with content 122 on server operated for the content service provided 124). In an example, the content service provider 124 can maintain a list of content associated with the subscriber's account and the content making up this list, or a portion thereof, can be synced with the OBD content device 102. Moreover, in such examples where the OBD content device 102 can wirelessly communicate with the cellular tower 134, the OBD content device 102 can provide access to the Internet 136 for the mobile devices 130 via wireless communication with the cellular tower 134. In some examples, due to the potentially smaller or more expensive bandwidth of the wireless connection with the cellular tower 134, the OBD content device 102 can be configured to download only selected content (e.g., smaller content or less quantity of content) via the cellular tower 134 as compared to the content downloaded from the content control device 118.

Advantageously, the OBD content device 102 can be configured to automatically download (e.g., sync) content with the content control device 118 and/or other electronic content device whenever the OBD content device 102 comes within range of wireless communication with the content control device 118 and/or other electronic content device. Accordingly, when a user 132 arrives at the subscriber's premises 120 with their vehicle 104 having the OBD content device 102 installed therein, the OBD content device 102 can automatically download (e.g., sync) content from the content control device 118 and/or other electronic content device, such that when the user leaves the subscriber's premises 120 with the vehicle 104, the user 132 can access the content 216 (or a portion thereof) on the OBD content device 102. Moreover, since the locally stored content 216 on the OBD content device 102 is not dependent upon a present Internet connection, the content 216 can be accessed anywhere the vehicle 104 travels and the content 216 can be accessed with a potentially high bandwidth communication (e.g., WiFi).

In some examples, the OBD content device 102 can have other purposes and functionality in addition to functioning as a content access device as described herein. For example, the OBD content device 102 can also be configured to obtain time-variant data corresponding to vehicle operation for the vehicle 104 over the OBD connectors 106, 108 from vehicle components on the vehicle electronics bus 110. Such time-variant information can be provided (e.g., via wireless communication with a cellular tower 134) to a third party for analysis, such as for use with usage based insurance. Examples of such functioning to obtain time-variant data corresponding to vehicle operation is described in U.S. patent application Ser. No. 13/972,400, filed on Aug. 21, 2013, titled "METHODS AND SYSTEMS FOR CONSUMER CONTROLLED INSURANCE DATA MANAGEMENT", which is hereby incorporated herein by reference. Other uses of the OBD content device 102 are also possible.

What is claimed is:

1. An electronic device comprising:
a connector configured to connect to an on-board diagnostic (OBD) connector of a vehicle;
a wireless transceiver;
one or more processing devices coupled to the connector and to the wireless transceiver;
storage media coupled to the one or more processing devices, the storage media including instructions which, when executed by the one or more processing devices, cause the one or more processing devices to:
establish communication with a content control device using the wireless transceiver;
download content from the content control device;
store the content on the storage media;
terminate communication with the content control device;
establish communication with a mobile device; and
provide the content to a mobile device via a wireless link.

2. The electronic device of claim 1, wherein the connector includes a plurality of power conductors that are configured to contact corresponding conductors on the OBD connector to receive power from the OBD connector, wherein the wireless transceiver, one or more processing devices, and storage media are coupled to the plurality of power conductors and are configured to operate based on power from the plurality of power conductors.

3. The electronic device of claim 1, wherein the instructions cause the one or more processing devices to:
provide authentication information to the content control device, the authentication information used by the content control device to authorize the electronic device to access content from the content control device.

4. The electronic device of claim 1, wherein the instructions cause the one or more processing devices to:
obtain a vehicle ID from the vehicle via the OBD connector; and
provide the vehicle ID to the content control device as the authentication information.

5. The electronic device of claim 1, wherein the instructions cause the one or more processing devices to:
obtain vehicle fingerprint information other than a vehicle ID from the vehicle via the OBD connector; and
provide the vehicle fingerprint information to the content control device as the authentication information.

6. The electronic device of claim 1, wherein the instructions cause the one or more processing devices to:
automatically synchronize content with the content control device when the electronic device is within communication range of the content control device.

7. The electronic device of claim 1, wherein the instructions cause the one or more processing devices to:
establish communication with multiple content control devices, including content control devices controlled by subscribers other than users associated with the electronic device;
download content from such content control devices;
store the content on the storage media; and
provide the content to a mobile device via a wireless link.

8. The electronic device of claim 1, wherein establish communication with the content control device includes establish communication using a wireless connection directly between the electronic device and the content control device.

9. The electronic device of claim 1, wherein establish communication with the content control device includes establish communication using a wireless connection between the OBD content device and a wireless router that is communicatively coupled to the content control device.

10. The electronic device of claim 1, wherein the content control device is a set top box configured to provide content to a monitor coupled to the content control device.

11. The electronic device of claim 1, wherein the instructions cause the one or more processing devices to:
obtain data corresponding to vehicle operation from the vehicle via the OBD connector; and
provide the data to a remote server.

12. A method for storing and accessing content in a vehicle, the method comprising:
obtaining operating power for an on-board diagnostic (OBD) content device from an OBD connector of a vehicle;
establishing communication between the OBD content device and a content control device using a wireless transceiver in the content device;
downloading content from the content control device to the OBD content device;
storing the content on a storage media of the OBD content device;
terminating communication between the OBD content device and the content control device;
establishing communication between the OBD content device and a mobile device; and
sending content from the OBD content device to the mobile device via a wireless link.

13. The method of claim 12 comprising:
sending authentication information from the OBD content device to the content control device, the authentication information used by the content control device to authorize the OBD content device to access content from the content control device.

14. The method of claim 13 comprising:
obtaining a vehicle ID from the vehicle via the OBD connector; and
wherein sending authentication information includes sending the vehicle ID.

15. The method of claim 13 comprising:
obtaining vehicle fingerprint information other than a vehicle ID from the vehicle via the OBD connector; and
wherein sending authentication information includes sending the vehicle fingerprint information.

16. The method of claim 12 comprising:
establishing communication between the OBD content device and multiple content control devices, including content control devices controlled by subscribers other than users associated with the OBD content device;
downloading content from such content control devices;
storing the content on the storage media; and
sending the content to a mobile device via a wireless link.

17. The method of claim 12, wherein establishing communication between the OBD content device and a content control device includes establishing communication using a wireless connection directly between the OBD content device and the content control device.

18. The method of claim 12, wherein establishing communication between the OBD content device and a content control device includes establishing communication using a wireless connection between the OBD content device and a wireless router that is communicatively coupled to the content control device.

19. The method of claim 12 comprising:
obtaining data corresponding to vehicle operation from the vehicle via the OBD connector; and
sending the data from the OBD content device to a remote server.

20. An electronic device comprising:
a wireless transceiver;
one or more processing devices coupled to the connector and to the wireless transceiver;
storage media coupled to the one or more processing devices;
a connector configured to connect to an on-board diagnostic (OBD) connector of a vehicle, the connector including a plurality of power conductors that are configured to contact corresponding conductors on the OBD connector to receive power from the OBD connector, wherein the wireless transceiver, one or more processing devices, and storage media are coupled to the plurality of power conductors and are configured to operate based on power from the plurality of power conductors;
wherein the storage media includes instructions which, when executed by the one or more processing devices, cause the one or more processing devices to:
establish communication with a content control device using the wireless transceiver;
obtain data corresponding to a vehicle to which the connector is connected from vehicle electronics coupled to the OBD connector;
send the data corresponding to the vehicle to the content control device, wherein the data is used by the content control device to authorize the electronic device to access content from the content control device;
download content from the content control device;
store the content on the storage media;
establish communication with a mobile device;
send the content to a mobile device via a wireless link;
obtain data corresponding to vehicle operation from the vehicle electronics coupled to the OBD connector; and
send the data corresponding to vehicle operation to a remote server.

* * * * *